Patented Nov. 22, 1938

2,137,295

UNITED STATES PATENT OFFICE 2,137,295

NITROGENOUS CONDENSATION PRODUCTS AND PROCESS OF PRODUCING SAME

Karl Koeberle, Ludwigshafen-on-the-Rhine, Germany, assignor to General Aniline Works, Inc., New York, N. Y., a corporation of Delaware No Drawing. Application May 5, 1936, Serial No. 77,993. In Germany May 9, 1935

4 Claims. (Cl. 260—558)

The present invention relates to nitrogenous condensation products and a process of producing them.

I have found that valuable nitrogenous condensation products can be obtained by heating polynuclear cyclic amines with any desired carboxylic acid amide in the presence of acid condensing agents.

For example aliphatic carboxylic amides, such as formamide, urea, urethane, acetamide, butyric acid amide, oleic acid amide, stearic acid amide, amides of aralkyl carboxylic acids, such as phenyl-acetic acid amide, cinnamic acid amide and phenyl-propionic acid amide, amides of cyclic carboxylic acids, such as benzamide, naphthalene carboxylic acid amides, anthraquinone carboxylic acid amides, amides of hydrobenzoic acids, hydronaphthoic acids, pyridine carboxylic acids, quinoline carboxylic acids, carbazole carboxylic acids, anthrapyrimidine carboxylic acids, fluorene carboxylic acids, pyrene carboxylic acids, diphenyl carboxylic acids, anthracene carboxylic acids and anthraquinone-acridone carboxylic acids may be caused to react with polynuclear cyclic amines.

This reaction of primary amines proceeds best with acid amides in which both hydrogen atoms of the acid amide group are present. In these cases the reaction proceeds with the splitting off of ammonia. The initial materials may, however, also be secondary amines and/or acid amides in which at least one hydrogen atom in the acid amide group is replaced by a radicle of low molecular weight. In this case the corresponding ammonia derivative is split off instead of ammonia. Generally speaking the reaction proceeds by gentle heating. The addition of a solvent or diluent is not necessary. When solid compounds of high molecular weight are employed as initial materials, it is, however, usually preferable to add diluents which do not react with the initial materials, as for example nitrobenzene, halogenbenzenes, xylenes or other benzene hydrocarbons. As acid agents may be employed, for example, mineral acids such as halogen hydracids, sulphur dioxide, sulphuric acid and halides of aluminium, zinc, copper and antimony, furthermore boric acid and acid salts such as sodium or ammonium bisulphate and ammonium chloride. When employing volatile amines it is preferable to work under superatmospheric pressure. By the said reaction, carboxylic acid amides are formed which under the reaction conditions in some cases may be converted into derivatives of the said acid amides, as for example by ring closure.

The compounds obtainable according to this invention are generally speaking very pure and are usually obtained in excellent yields which frequently reach the calculated yields. By reason of the large number of initial materials capable of employment, the final products are capable of a great variety of industrial uses. Thus, depending on the kind of the initial carboxylic acid amides and amines, there may be obtained dyestuffs, assistants for the dyeing industries, medicaments and compounds which may be employed for the preparation of substances of the said kind.

The following examples will further illustrate how the said invention may be carried out in practice but the invention is not restricted to these examples. The parts are by weight.

Example 1

A mixture of 230 parts of 1-aminoanthraquinone, 1000 parts of nitrobenzene and 150 parts of benzamide is heated for some hours while stirring and leading in hydrogen chloride. When a sample withdrawn no longer contains unchanged 1-aminoanthraquinone, the whole is allowed to cool and the separated 1-benzoylamino-anthraquinone is filtered off by suction. The yield amounts to from 320 to 325 parts. It has the melting point given in the literature and is thus completely pure. Instead of nitrobenzene, other diluents may be employed as for example trichlorbenzene, naphthalene or ortho-dichlorbenzene.

The reaction of 250 parts of benzamide on 230 parts of 1-aminoanthraquinone in the presence of hydrogen chloride proceeds similarly without the employment of a diluent. Similarly 1-benzoylaminoanthraquinone is obtained from 1-aminoanthraquinone by heating with an excess of benzamide without leading in hydrogen chloride.

From 2-aminoanthraquinone and benzamide, 2-benzoylamino-anthraquinone may be obtained in an analogous manner; 1,5-diaminoanthraquinone with from 2 to 3 molecular proportions of benzamide yields 1,5-dibenzoyldiaminoanthraquinone, 1,4-diaminoanthraquinone in a corresponding manner yields 1,4-dibenzoyldiaminoanthraquinone and 1,8-diaminoanthraquinone yields 1,8-dibenzoyldiaminoanthraquinone.

1 - amino - 5 - para - chlorbenzoylaminoanthraquinone yields 1-benzoylamino-5-para-chlorbenzoylaminoanthraquinone, 1,4-diaminoanthraquinone and from 1 to 1½ molecular proportions of benzamide yields 1-amino-5-benzoylaminoanthraquinone and 1-amino-5-chloranthraquinone and benz amide yield 1-benzoylamino-5-chloranthraquinone.

If aminoanthraquinones be heated with a derivative of benzoic acid amide, as for example with chlorbenzamide, methoxybenzamide, diphenyl carboxylic acid amide, toluyl acid amide, bromo-benzoic acid amide, nitrobenzoic acid amide, hydroxybenzoic acid amide or a benzoylaminobenzoic acid amide, the corresponding aroylaminoanthraquinones are obtained usually in excellent yields and excellent state of purity.

1-beta-naphthoylaminoanthraquinone is obtained by the reaction of 1-aminoanthraquinone with beta-naphthoic acid amide. If a quinoline carboxylic acid amide, as for example quinoline-4- or 6-carboxylic acid amide, be employed instead of naphthoic acid amide, the corresponding quinolinecarbonylaminoanthraquinones are obtained. Pyridino-beta-carbonylaminoanthraquinone may be obtained from nicotinic acid amide and 1-aminoanthraquinone.

Similarly from 1-aminoanthraquinone and anthraquinone-2-carboxylic acid amide, the corresponding anthraquinone carboxylic acid amide is obtained in an excellent yield and purity; the corresponding acylamine is obtained from 1-aminoanthraquinone and 1-aminoanthraquinone-2-carboxylic acid amide and the corresponding 1-acylaminoanthraquinones may be obtained from 1-aminoanthraquinone and anthraquinone-benzacridone-4'-carboxylic acid amide, anthraquinone-thioxanthonecarboxylic acid amide, 1,9-pyrazol-2-carboxylic acid amide, 1,9-selenazol- or 1,9-thiazol-2-carboxylic acid amide. Other carboxylic acid amides of derivatives of anthraquinone, as for example pyridinoanthraquinone carboxylic acid amides, benzanthronecarboxylic acid amides, anthrapyridine- and anthrapyrimidine-carboxylic acid amides, anthrapyridone carboxylic acid amides, anthraquinoneazol carboxylic acid amides and also amides of carboxylic acids of other cyclic compounds, as for example carboxylic acid amides of 1-azanthraquinone, fluorine, phenanthrene, pyrene, diphenylene oxide, carbazole and many other compounds are also suitable for the reaction.

If a mixture of two or more acid amides be employed with polyaminoanthraquinones, mixed acylated aminoanthraquinones are obtained.

Example 2

A mixture of 46 parts of 1-aminoanthraquinone, 200 parts of nitrobenzene and 80 parts of formamide is boiled for 2 hours while stirring and leading in hydrogen chloride. The whole is allowed to cool and the precipitated 1-formylaminoanthraquinone is filtered off by suction. The yield is quantitative. The compound forms yellow needles and has the characteristic properties of 1-formylaminoanthraquinone. The reaction may also be carried out in the absence of nitrobenzene.

In the same manner entirely pure 1-acetylaminoanthraquinone is obtained in the calculated yield from 1-aminoanthraquinone and acetamide. From 1-aminoanthraquinone and lauric acid amide there is obtained 1-laurylaminoanthraquinone in the form of yellow crystals which yield a red vat and dye cotton yellow shades.

From 1-amino-5-benzoylaminoanthraquinone and oxamide there is obtained a vat dyestuff yielding yellow dyeings which agrees with the dyestuff obtainable from 1-amino-5-benzoylaminoanthraquinone and oxalyl chloride.

Similarly 1-acetylamino-5-benzoylaminoanthraquinone is obtained in the calculated yield from 1-amino-5-benzoylaminoanthraquinone and acetamide.

Instead of the said carboxylic acid amides, propionic acid amide, butyric acid amide, stearic acid amide, oleic acid amide, palmitic acid amide or other aliphatic carboxylic acid amides may be caused to react with aminoanthraquinones.

Example 3

A mixture of 20 parts of 1,4-di-(monomethylamino)-anthraquinone, 40 parts of benzamide and 100 parts of nitrobenzene is boiled while stirring and leading in hydrogen chloride gas until the original pure blue color of the solution has become red. The whole is then allowed to cool and the 1,4-dibenzoyldiaminoanthraquinone formed is filtered off by suction. It yields a brown-red vat and dyes vegetable fibres red shades.

In the same manner, 1-benzoylaminoanthraquinone is formed from 1-methylaminoanthraquinone; similarly the reaction of 1-aminoanthraquinone with N-methyl- or N-dimethyl-benzamide yields 1-benzoylaminoanthraquinone.

Example 4

A suspension of 250 parts of 4-amino-1,9-anthrapyrimidine and 250 parts of para-chlorbenzamide in 1000 parts of nitrobenzene is boiled while stirring and leading in dry hydrogen chloride until unchanged amine or amine hydrochloride can no longer be detected. The whole is then allowed to cool and the 4-para-chlorbenzoylamino-1,9-anthrapyrimidine formed is filtered off by suction. The yield is practically quantitative.

Similarly the corresponding acylamines are obtained from 4-amino-1,9-anthrapyrimidine and other acid amides. Instead of 4-amino-1,9-anthrapyrimidine, the isomers of the same and the derivatives of aminoanthrapyrimidines may also be used as initial materials. The hydrogen chloride may also be replaced for example by hydrogen bromide or sulphuric acid.

Instead of aminoanthrapyrimidines, other amines which are derived from anthraquinone by the joining on of a peri-ring, as for example the aminoanthrapyridones, aminoanthrapyrimidones, aminopyrazolanthrones, aminobenzanthrones, aminoazabenzanthrones, aminoindoloanthrones or amino-1,9-selenazolanthrones may be converted into acylamino compounds.

Example 5

A suspension of 125 parts of 1-aminoanthraquinone and 200 parts of phenyl acetic acid amide in 1000 parts of trichlorbenzene is boiled while stirring and leading in hydrogen chloride until unchanged 1-aminoanthraquinone is no longer detectable. The whole is then allowed to cool and the 1-phenylacetylaminoanthraquinone precipitated in an entirely pure state is filtered off by suction. The yield is quantitative.

If other amides of aralkyl carboxylic acids be employed instead of phenylacetic acid amide, other aralkylcarboxylic-amido-anthraquinones are obtained. Thus for example 1-cinnamoylamino-4-chloranthraquinone is obtained from 1-amino-4-chloranthraquinone and cinnamic acid amide.

Example 6

A suspension of 110 parts of 4-amino-3',4',6'-trichlor-anthraquinone-2,1-benzeneacridone and 300 parts of benzamide in 2500 parts of nitrobenzene is boiled for some hours while stirring and leading in hydrogen chloride. After cooling, the resulting 4-benzoylamino-3',4',6'-trichloranthraquinonebenzene-acridone is filtered off by suction. The yield is quantitative.

4-benzoylamino-ortho-chlorphenyl-1,2-anthraquinoneimidazole is obtained from 4-amino-ortho-chlorphenyl-1,2-anthraquinoneimidazole and benzamide. Similarly other aminoanthraquinones having laterally attached rings, as for example aminopyridinoanthraquinones, aminobenzanthraquinones, aminoanthraquinonethioazoles, aminoanthraquinoneoxazoles, aminoanthraquinoneselenazoles, aminoanthraquinoneazines or derivatives of high molecular weight of anthraquinone or of benzanthrone, such as aminopyranthrone, aminodibenzanthrone and monoamino, and poly-amino-allo-ms-naphthodianthrones may be acylated.

Example 7

A mixture of 230 parts of 1-aminoanthraquinone, 1000 parts of nitrobenzene, 50 parts of anhydrous aluminium chloride and 500 parts of benzamide is boiled while stirring until 1-aminoanthraquinone can no longer be detected. The whole is then allowed to cool and is worked up in the usual manner; 1-benzoylaminoanthraquinone is thus obtained in the form of yellow crystals.

Instead of aluminium chloride, a little antimony pentachloride, phosphorus halides or copper chloride may be added.

Similarly 1-aminoanthraquinone yields by heating with benzamide, 1-benzoylaminoanthraquinone, while with acetamide it is converted into 1-acetylaminoanthraquinone.

Example 8

A suspension of 300 parts of 1-amino-2-bromoanthraquinone and 400 parts of para-chlorbenzamide in 1000 parts of nitrobenzene is boiled for some hours while stirring and leading in dry hydrogen chloride. When a sample withdrawn no longer contains 1-amino-2-bromoanthraquinone, the whole is allowed to cool and the yellow needles formed are filtered off by suction. Analysis and behavior indicate that the product is para-chlorphenyl-1(N),2-anthraquinoneoxazole.

With anthraquinone-2-carboxylic acid amide, anthraquinone-1(N),2-anthraquinoneoxazole is formed and with 1-aminoanthraquinone-2-carboxylic acid amide the corresponding aminoanthraquinone-anthraquinoneoxazole is formed.

Instead of 1-amino-2-bromoanthraquinone, 1-methylamino-2-bromoanthraquinone may be employed with equal result.

Benzoylamino -1,2- phenylanthraquinoneimidazole may be formed from 1,2,4-triaminoanthraquinone and benzamide, and anthraquinone-2(N),1-phenylthiazole may be formed from 1-mercapto-2-aminoanthraquinone and benzamide.

2-amino-3-hydroxyanthraquinone and 1-aminoanthraquinone-2-carboxylic acid amide yield anthraquinone-2(N),3-aminoanthraquinonyloxazole by way of the acylamine formed as intermediate product.

While 2-aminoanthraquinone is converted by heating with benzamide into 2-benzoylaminoanthraquinone, there is obtained either from 2-amino-3-bromoanthraquinone or from 2-amino-3-hydroxyanthraquinone the corresponding anthraquinone-2(N),3-phenyloxazole.

Example 9

A mixture of 100 parts of 1-aminoanthraquinone, 100 parts of urethane and 500 parts of nitrobenzene is heated at between 120° and 180° C., while leading in dry hydrogen chloride until a sample dissolved in sulphuric acid no longer changes color, even by heating, on addition of formaldehyde. The mixture is then allowed to cool and worked up in the usual manner. The resulting compound obtained in a good yield and in a state of high purity is 1,9-anthrapyrimidone, according to its properties and analysis.

Instead of hydrogen chloride, other acid condensing agents, as for example ammonium bisulphate, alkali metal bisulphates, ammonium chloride, sulphuric acid, sulphur dioxide or perchloric acid may also be employed.

If substituted 1-aminoanthraquinones, as for example 1-aminoacylaminoanthraquinones, such as 1-amino-3-, 1-amino-4-, 1-amino-5- or 1-amino-8-acylaminoanthraquinones or 1-amino-hydroxy- or 1-amino-methoxyanthraquinones, or 1-amino-halogenanthraquinones or 1-amino-nitro- or 1-amino-carboxyanthraquinones or 1-aminoanthraquinonealdehydes or 1-aminoanthraquinone carboxylic acids or 1-aminoanthraquinonesulphonic acids be employed as initial materials, the corresponding derivatives of anthrapyrimidone are obtained.

Instead of urethane, urea may be employed. Nitrobenzene may be replaced by another diluent, as for example by ortho-dichlorbenzene, trichlorbenzene, naphthalene, phenol or anisole.

Example 10

A mixture of 23 parts of 2-aminoanthraquinone, 10 parts of urea and 120 parts of nitrobenzene is boiled, while stirring and leading in hydrogen chloride until unchanged 2-aminoanthraquinone can no longer be detected. The mixture is then allowed to cool and the solvent is removed by filtering by suction or distillation, if desired by means of steam as usual. The resulting compound is a well crystallized yellow powder the analysis and properties of which identify it to be 2,2'-dianthraquinonyl-urea. The yield corresponds to the calculated one.

The corresponding urea derivatives from amino-1,9-anthrapyrimidines, amino-1,9-anthrapyrimidones, amino-1,9-anthrapyridones, aminoazabenzanthrones, as for example amino-Bz3-azabenzanthrone or from aminopyridinoanthraquinones, amino compounds of dibenzpyrenequinone, isodibenzpyrenequinone, anthanthrone, pyranthrone, dibenzanthrone and isodibenzanthrone, anthraquinonebenzacridone and anthraquinoneazoles can be obtained in an analogous manner.

By using substituted 2-aminoanthraquinones the correspondingly substituted urea derivatives are obtained, as for example 1,1'-dichlor-2,2'-dianthraquinonyl urea from 1-chlor-2-aminoanthraquinone. When using different amines differently substituted urea derivatives are obtained.

From the diamides of oxalic acid, succinic acid and similar dicarboxylic acids and amino compounds of anthraquinone and its derivatives the corresponding dicarboxylic acid amides are obtained.

By starting from amino naphthalenes in the presence of hydrogen chloride, the corresponding ureas are obtained in an excellent yield.

Example 11

A mixture of 250 parts of 1-amino-2-hydroxyanthraquinone, 1000 parts of nitrobenzene and 500 parts of acetamide is heated at 150° C. while stirring, hydrogen chloride gas being led in until a sample withdrawn no longer changes color on the addition of sulphuric acid and formaldehyde, which is the case in general after some hours.

The mixture is then allowed to cool and worked up in the usual manner. The Py-C-methyl-2-hydroxy-1,9-anthrapyrimidine which results in a very good yield and in a state of high purity is a yellow crystalline powder which dissolves in concentrated sulphuric acid giving a golden-yellow color. It gives an orange vat and dissolves in alkalis giving a red coloration. It melts at between 250° and 252° C.

When using, instead of acetamide, propionamide the Py-C-ethyl-2-hydroxy-1,9 - anthrapyrimidine is obtained in an analogous manner, with butyric acid amide the corresponding propyl derivative and with capric acid amide the Py-C-butyl derivative are obtained. In an analogous manner, when starting from aliphatic carboxylic acid amides of high molecular weight, as for example lauric acid amide, oleic acid amide, stearic acid amide, 2-hydroxy-1,9-anthrapyrimidines are are obtained which contain in the Py-C-position the radicle formerly attached to the carbonamide group of the acid amide employed.

Substituted aliphatic carboxylic acid amides, as for example cyanacetamide, chloracetamide, phenylacetamide and pyridylacetamide can also be used as initial materials.

Hydroaromatic carboxylic acid amides, as for example hexahydrobenzamide, amides of naphthenic acids, abietic acid amide, dihydroabietic acid amide are particularly suitable for this reaction. In the same manner aromatic and heterocyclic acid amides may also be converted into 2-hydroxy-1,9-anthrapyrimidines which bear in the Py-C-position the aromatic or heterocyclic radicle of the carboxylic acid amide employed.

Instead of 1-amino - 2 - hydroxyanthraquinone other 1-aminohydroxyanthraquinones may also be employed as initial materials. -

As condensing agents acid salts such as ammonium bisulphate, sodium bisulphate, aluminium sulphate or other acids, as for example sulphuric acid, hydrobromic acid and hydriodic acid, perchloric acid or sulphur dioxide may be used.

The reaction may also be carried out without diluents.

Example 12

A mixture of 25 parts of 1-amino-2-hydroxyanthraquinone and 100 parts of formamide is heated at 120° C. while stirring. Dry hydrogen chloride gas is then led in and the mixture is stirred at between 130° and 135° C. until a sample withdrawn no longer contains unchanged 1-amino-2-hydroxyanthraquinone, which is the case already after a very short time. The mixture is then allowed to cool, diluted with hot water and the crystallized 2-hydroxy-1,9-anthrapyrimidine which results in a good yield and a state of high purity is filtered off by suction. It dissolves in dilute alkalies giving a red coloration, and in concentrated sulphuric acid giving a yellow coloration. It melts towards 300° C.

From 1-amino - 4 - hydroxyanthraquinone and formamide crystallized 4-hydroxy-1,9-anthrapyrimidine is obtained in a similar manner, from 1-amino-2,4-dihydroxyanthraquinone the 2,4-dihydroxy-1,9 - anthrapyrimidine, from 4 - amino-1,2-dihydroxyanthraquinone the 3,4 - dihydroxy-1,9-anthrapyrimidine, from 1 - hydroxy - 2,4 - diaminoanthraquinone the 4-hydroxy - 3 - amino-1,9-anthrapyrimidine, from 1-amino-2-hydroxybromanthraquinone a bromo-2-hydroxy-1,9 - anthrapyrimidine are obtained. From 1-amino-beta-hydroxyanthraquinones substituted in another way the corresponding beta-hydroxy-1,9-anthrapyrimidines are obtained in a similar manner, for example from 1-amino-3-hydroxyanthraquinone the 3 -hydroxy - 1,9 - anthrapyrimidine, from 1-amino-6-hydroxyanthraquinone the 6 - hydroxy - 1,9 - anthrapyrimidine and from 1 - amino-7-hydroxy-anthraquinone the 7-hydroxy-1,9-anthrapyrimidine are obtained.

Instead of hydrogen chloride other acid condensing agents may be employed. In many cases, it is advisable to use a diluent, as for example nitrobenzene or phenol.

If necessary, the resulting hydroxy-1,9-anthrapyrimidines may be purified or separated from any isomers by way of their salts or by crystallization or sublimation.

From oxygen esters or from ethers of alpha-aminoanthraquinone, as for example from 1-amino-2-acetoxyanthraquinones or 1-amino-2-methoxyanthraquinone and basic carboxylic acid amides the corresponding oxygen ethers and oxygen esters of 1,9-anthrapyrimidines, and from 1-amino-2-mercaptoanthraquinone and formamide and ammonium bisulphate 2-mercapto-1,9-anthrapyrimidine and from 1-aminoanthraquinone-2-selenide, under the same conditions, the 2-selenide of the 1,9-anthrapyrimidine is obtained, while 1-mercapto-2-aminoanthraquinones or 1-seleno-2-aminoanthraquinones are converted into thiazoles and selenazoles respectively of the anthraquinone series by means of monobasic carboxylic acid amides and acid condensing agents.

From 1,2-diaminoanthraquinones by means of formamide in the presence of hydrochloric acid 2-amino-1,9-anthrapyrimidine, and from 1-amino-2-methylaminoanthraquinone and formamide hydrochloric acid 2-methylamino-1,9-anthrapyrimidine which has a green-yellow fluorescence in hydrocarbons are obtained.

Example 13

25 parts of 1-amino-2-methyl-4-para-toluidoanthraquinone are introduced into 100 parts of formamide and heated to 120° C. while stirring. Hydrogen chloride is then led in, and the mixture is heated at 150° C. until initial material is no longer detectable. It is then allowed to cool and worked up in the usual manner. The 4-para-toluido-2 - methyl-1,9 - anthrapyrimidine which results in an excellent yield and in a state of high purity dissolves in concentrated sulphuric acid giving a blue coloration and as sulphonic acid dyes vegetable and animal fibers red shades.

Instead of 1-amino-2-methyl-4-toluidoanthraquinone, other 1-amino-arylidoanthraquinones, as for example 1-amino-4-anilidoanthraquinone, 1-amino-4-pseudocumidinoanthraquinone or 1-amino-(2',6'-dimethyl)-4 - anilidoanthraquinone or 1-amino-(2',6'-dihalogen)-4 - anilidoanthraquinones may also be employed as initial materials.

What I claim is:

1. A process of producing nitrogenous condensation products which comprises heating an amino substitution product of a polynuclear compound of the anthraquinone series with a carboxylic acid amide in the presence of an acid condensing agent.

2. A process of producing nitrogenous condensation products which comprises heating an amino substitution product of a polynuclear compound of the anthraquinone series with a carboxylic acid amide in the presence of a mineral acid.

3. A process of producing nitrogenous condensation products which comprises heating an amino substitution product of a polynuclear compound of the anthraquinone series with a carboxylic acid amide in the presence of hydrogen chloride.

4. A process of producing nitrogenous condensation products which comprises heating a vattable amino substitution product of a polynuclear compound of the anthraquinone series with a carboxylic acid amide in the presence of an acid condensing agent.

KARL KOEBERLE.